(12) United States Patent
Iseki et al.

(10) Patent No.: US 8,943,784 B2
(45) Date of Patent: Feb. 3, 2015

(54) METHOD FOR PRODUCING FOOD FILLED AND SEALED CONTAINER

(75) Inventors: Takeshi Iseki, Tokushima (JP);
Masakatsu Kondo, Tokushima (JP);
Masao Kubo, Tokyo (JP); Tomoyuki Masuda, Tokyo (JP)

(73) Assignees: Kabushiki Kaisha Yakult Honsha, Tokyo (JP); Shikoku Kakoki Co., Ltd., Tokushima (JP)

( * ) Notice: Subject to any disclaimer, the term of this patent is extended or adjusted under 35 U.S.C. 154(b) by 0 days.

(21) Appl. No.: 13/319,640

(22) PCT Filed: May 11, 2010

(86) PCT No.: PCT/JP2010/003188
§ 371 (c)(1),
(2), (4) Date: Dec. 2, 2011

(87) PCT Pub. No.: WO2010/131457
PCT Pub. Date: Nov. 18, 2010

(65) Prior Publication Data
US 2012/0067765 A1    Mar. 22, 2012

(30) Foreign Application Priority Data

May 13, 2009 (JP) .................. 2009-116563

(51) Int. Cl.
*B65B 7/28* (2006.01)
*B65B 51/10* (2006.01)
*B65D 85/72* (2006.01)
(Continued)

(52) U.S. Cl.
CPC .............. *B65D 85/72* (2013.01); *B29C 65/082* (2013.01); *B29C 65/18* (2013.01); *B29C 65/8253* (2013.01); *B29C 66/1312* (2013.01); *B29C 66/3022* (2013.01); *B29C 66/542* (2013.01); *B29C 66/73921* (2013.01); *B29C 66/81422* (2013.01); *B29C 66/83221* (2013.01); *B65B 51/14* (2013.01); *B65D 41/165* (2013.01); *B29C 66/71* (2013.01); *B29C 66/81435* (2013.01); *B29C 66/919* (2013.01); *B29C 65/8238* (2013.01)
USPC ................................... 53/471; 53/478

(58) Field of Classification Search
USPC .................. 53/471, 478, 329.3, 281
See application file for complete search history.

(56) References Cited

U.S. PATENT DOCUMENTS 3,060,652 A * 10/1962 Eckman ................. 53/478
3,517,475 A *  6/1970 Balocca ................. 53/432
(Continued)

FOREIGN PATENT DOCUMENTS

JP        03-240667    10/1991
JP        3026497       4/1996
(Continued)

*Primary Examiner* — Gloria R Weeks
(74) *Attorney, Agent, or Firm* — Kenneth H. Sonnenfeld; Margaret B. Brivanlou; King & Spalding LLP

(57) ABSTRACT

It is a method for producing a food-filled and sealed container having a high product value, in which a container lid made of resin is not deformed after sealing. In this method for producing a food-filled and sealed container, after a food is filled in a container body (10) made of thermoplastic resin, the container is sealed by heat sealing a container lid (20) made of thermoplastic resin, and the container body (10) and/or the container lid (20) have sealing surfaces (13, 24) provided with a concavity or convexity.

6 Claims, 7 Drawing Sheets

(51) Int. Cl.
*B29C 65/08* (2006.01)
*B29C 65/18* (2006.01)
*B29C 65/82* (2006.01)
*B29C 65/00* (2006.01)
*B65B 51/14* (2006.01)
*B65D 41/16* (2006.01)

(56) References Cited

U.S. PATENT DOCUMENTS

| | | | |
|---|---|---|---|
| 4,338,765 A * | 7/1982 | Ohmori et al. | 53/452 |
| 4,396,655 A * | 8/1983 | Graham et al. | 428/34.4 |
| 4,785,992 A * | 11/1988 | Goeppner | 229/5.6 |
| 4,892,227 A * | 1/1990 | MacLaughlin | 220/270 |
| 5,032,213 A * | 7/1991 | Thomas, Jr. | 156/498 |
| 5,090,180 A * | 2/1992 | Sorensen | 53/471 |
| 5,316,603 A * | 5/1994 | Akazawa et al. | 156/69 |
| 5,566,529 A * | 10/1996 | Sireix | 53/412 |
| 5,582,665 A * | 12/1996 | Eigen et al. | 156/69 |
| 5,819,507 A * | 10/1998 | Kaneko et al. | 53/473 |
| 5,913,798 A * | 6/1999 | Grabher | 53/478 |
| 5,983,607 A * | 11/1999 | Mihalov et al. | 53/478 |
| 5,983,608 A * | 11/1999 | Wu et al. | 53/478 |
| 6,058,682 A * | 5/2000 | Pajak et al. | 53/478 |
| 6,725,630 B2 * | 4/2004 | Rea et al. | 53/478 |
| 6,802,920 B2 * | 10/2004 | Shinohara et al. | 156/73.1 |
| 7,556,706 B2 * | 7/2009 | Yewdall et al. | 156/242 |
| 7,748,101 B2 * | 7/2010 | Williamson | 29/521 |
| 7,886,899 B2 * | 2/2011 | Frutin | 206/221 |
| 8,371,014 B2 * | 2/2013 | Williamson | 29/521 |
| 8,418,871 B1 * | 4/2013 | LaMasney | 220/324 |
| 8,807,374 B2 * | 8/2014 | Caunter et al. | 220/359.4 |
| 2003/0021920 A1 * | 1/2003 | Williamson et al. | 428/34.1 |
| 2004/0094255 A1 * | 5/2004 | Shinohara et al. | 156/73.1 |
| 2007/0137019 A1 * | 6/2007 | Williamson | 29/525 |
| 2008/0072550 A1 * | 3/2008 | O'Neill | 53/478 |
| 2008/0223856 A1 * | 9/2008 | Oberholzer | 220/359.1 |
| 2013/0047559 A1 * | 2/2013 | Minnette | 53/471 |
| 2014/0215974 A1 * | 8/2014 | Minnette et al. | 53/478 |

FOREIGN PATENT DOCUMENTS

| | | |
|---|---|---|
| JP | 11-010810 | 1/1999 |
| JP | 11-152166 | 6/1999 |
| JP | 2002-019820 | 1/2002 |
| JP | 2004-074795 | 3/2004 |
| JP | 2004-074796 | 3/2004 |
| JP | 2004-075196 | 3/2004 |
| JP | 2004-075197 | 3/2004 |
| JP | 2004-154957 | 6/2004 |
| JP | 2005-040096 | 2/2005 |
| WO | WO 02/072426 | 9/2002 |

\* cited by examiner (A)

13a (B)

13b (C)

13c (D)

13d (A)

24a (B)

24b (A)

(B)

US 8,943,784 B2

METHOD FOR PRODUCING FOOD FILLED AND SEALED CONTAINER

TECHNICAL FIELD

The present invention relates to a method for producing a food-filled and sealed container which involves filling food in a container body and thereafter heat sealing a container lid to seal the container.

BACKGROUND ART

What is called general-purpose polystyrene-based resin (GPPS), such as styrene homopolymer, excellent in tensile strength, heat resistance, light resistance, formability and surface glossiness, and high-impact polystyrene (HIPS) which is formed of GPPS with rubber, such as SBR and BR, added thereto to improve the brittleness of GPPS, have hitherto been in heavy usage as materials for beverage containers, yogurt containers, portion containers and food containers for pot noodle and the like. As a lid material to be stuck to the opening of such a polystyrene-based resin container to seal the opening, there has been used an aluminum laminate which includes aluminum foil as the base material and a sealant layer and the like provided on the surface of the base material for adhesion with a container. The opening of a container has hitherto been sealed with a small piece of aluminum lid material, which is blanked out of such an aluminum laminate into a spread form of a lid, with its end portion folded back into a skirt like shape. Such a lid made of aluminum has been regularly used because it is excellent in sealing properties and stability at the time of pealing, and has good sheet-feed properties with little adhesion by static electricity when fed to the opening of a container. Furthermore, once a skirt portion is provided by bending a circumferential edge portion, such a lid made of aluminum is excellent in what is called shape retention, i.e., the property that the bent and deformed shape is retained. For this reason, when a filled beverage is to be consumed directly from a container, it is possible to prevent the contamination of the area in the vicinity of the opening of the container because the portion in the vicinity of the opening of the container which comes into contact with the mouth is better maintained in a condition covered with an end portion of the lid. Thus a lid made of aluminum, which is excellent sanitarily and also excellent in terms of appearance, has hitherto been used in a preferable manner.

These days, however, there are often cases where foreign substances accidentally get into processed food containers, leaving challenges for safety measures. For a container with such a lid made of aluminum, since a metal detector cannot be used to check the entire product, there is a problem of inability to detect metals which might get into containers, such as nails, staples, broken pieces of molded article extraction blades, bolts and nuts, wires, and springs. Besides, for these containers with a lid made of aluminum, lids made of aluminum and container bodies made of synthetic resin, such as polystyrene, must be segregated and recovered, and hence these containers have the drawback of poor recyclability.

As a substitute for such a conventional lid made of aluminum, there has been proposed, for example, a lid material which is blanked out of a laminate material into a prescribed shape, the laminate material including a sealant material provided on the lower surface of a laminate base material, which includes a heat-resistant film laminated on opposite sides of a base material of a coextruded film which is provided with a center layer formed from high-density polyethylene and a polypropylene-based polymer and a coating layer formed from high-density polyethylene on opposite sides of this center layer (refer to patent document 1). Furthermore, the present applicants have proposed a sealed container having shape retention, which is obtained by cold molding polystyrene-based resin sheet which is such that the propagation energy in a 150-μm thick sheet measured by the weight-drop impact test method in accordance with ASTM-D3763 is not less than 0.015 J (refer to patent documents 2 to 6).

On the other hand, there have been proposed methods for heat sealing a container lid by using a container having a protruding heat-seal line on the upper surface of a flange of a container body or a container having a linear groove at the center of the upper surface of a flange of a container body (refer to patent documents 7 and 8). However, in the container described in patent document 7, the interior and exterior of the container are aerated to prevent complete sealing when the contents are substances that ferment, and in the container described in patent document 8, air is introduced into a groove not in communication with the exterior of the container, whereby poor sealing is prevented and an aluminum lid is caused to peel off readily.

PRIOR ART DOCUMENTS

Patent Documents

Patent Document 1: Japanese Unexamined Patent Application Publication No. 11-10810
Patent Document 2: Japanese Unexamined Patent Application Publication No. 2004-74795
Patent Document 3: Japanese Unexamined Patent Application Publication No. 2004-74796
Patent Document 4: Japanese Unexamined Patent Application Publication No. 2004-75196
Patent Document 5: Japanese Unexamined Patent Application Publication No. 2004-75197
Patent Document 6: Japanese Unexamined Patent Application Publication No. 2004-154957
Patent Document 7: Japanese Unexamined Patent Application Publication No. 11-152166
Patent Document 8: Japanese Utility Model Application No. 3026497

SUMMARY OF THE INVENTION

Object to be Solved by the Invention

In a food-filled and sealed container which is such that by using a container lid made of thermoplastic resin as described above, the container is sealed by heat sealing a container body filled with food, with an air-containing portion left, due to the expansion and contraction of the air in the sealed container resulting from environmental changes (changes in temperature and atmospheric pressure), the shape sometimes changed to such an extent that the appearance was impaired thereby. That is, the air present in a sealed container warmed during heat sealing contracts thereafter and a container lid becomes recessed and deformed; a sealed container is exposed to high temperatures for a long time or the atmospheric pressure drops, with the result that the air present in the sealed container expands and the container lid sometimes bulges; and in the case of a container lid made of a thermoplastic resin having high stiffness, the bulge is not uniform and waviness and warpage deformation occur, impairing the appearance and causing a decrease in product value.

The object of the present invention is to provide a method for producing a food-filled and sealed container having a high product value whose container lid is not deformed after sealing due to the expansion and contraction of the air in the container.

Means to Solve the Object

In order to solve the above-described problem, the present inventors devoted themselves to studies, and as a result they found that by performing heat sealing using a container body or container lid of such a construction that the air in the container can escape to the outside during heat sealing, i.e., by performing heat sealing using a container body or container lid having a concavity or convexity on a sealing surface, the air in the container is discharged to the outside during heat sealing and the volume of the air remaining in the sealed container decreases, with the result that it is possible to prevent the deformation of the container lid caused by the expansion and contraction of the air in the sealed container. The present invention has been thus completed.

That is, the present invention relates to (1) a method for producing a food-filled and sealed container, comprising filling food in a container body made of thermoplastic resin and thereafter sealing the container by heat sealing a container lid made of thermoplastic resin, wherein a container body or container lid having a concavity or convexity on a sealing surface is used; (2) the method for producing a food-filled and sealed container according to (1) above, in which a container body having no concavity or convexity on a sealing surface and a container lid having a concavity or convexity on a sealing surface are used; (3) a method for producing a food-filled and sealed container, comprising filling food in a container body made of heat-resistant resin, metal or paper, and thereafter sealing the container by heat sealing a container lid made of thermoplastic resin, wherein a container lid having a concavity or convexity on a sealing surface is used; (4) the method for producing a food-filled and sealed container according to any one of (1) to (3) above, wherein the container body or container lid having a concavity or convexity on a sealing surface is fabricated by forming a concavity or convexity on the sealing surface of the container body or container lid having no concavity or convexity on the sealing surface; (5) the method for producing a food-filled and sealed container according to any one of (1) to (3) above, wherein a container body or container lid having a concavity or convexity on a sealing surface is fabricated by forming a concavity or convexity at the same time with the molding of the container body or the container lid; (6) the method for producing a food-filled and sealed container according to any one of (1) to (3) above, wherein a container lid having a concavity or convexity on a sealing surface is fabricated from a sheet material having a concavity or convexity; (7) the method for producing a food-filled and sealed container according to any one of (1) to (6) above, wherein the height of concavity or convexity is 0.05 to 1.5 mm; (8) the method for producing a food-filled and sealed container according to anyone of (1) to (7) above, wherein heat sealing is performed by depressing a central part of the container lid on the inner side of a sealing surface of the lid; (9) the method for producing a food-filled and sealed container according to any one of (1) to (8) above, wherein heat sealing is performed by using an ultrasonic sealing device; (10) the method for producing a food-filled and sealed container according to (9) above, in which a horn of the ultrasonic sealing device is provided with warming means; and (11) the method for producing a food-filled and sealed container according to anyone of (1) to (10) above, in which sealing is performed with the container body compressed in vertical direction.

Also the present invention relates to (12) a food-filled and sealed container produced by the method according to any one of (1) to (11) above, wherein the central part of a container lid is recessed; (13) the food-filled and sealed container according to (12) above, in which a negative pressure is developed in the container; (14) a container body made of thermoplastic resin which is sealed with a container lid by heat sealing, wherein the container body has, on a sealing surface projections spaced from each other circumferentially; and (15) the container body according to (14) above, in which the height of the projections is 0.05 to 1.5 mm.

Furthermore, the present invention relates to (16) a container lid made of thermoplastic resin which seals a container body by heat sealing, wherein the container lid has a concavity or convexity on a sealing surface; (17) the container lid according to (16) above, in which the height of the concavity or convexity is 0.05 to 1.5 mm; (18) the container lid according to (16) or (17) above, wherein the container lid is fabricated from a sheet material having a concavity or convexity; (19) the container lid according to anyone of (16) to (18) above, wherein the container lid is a lid having shape retention which is fabricated by cold molding from a polystyrene-based resin sheet and is provided with a top plate portion and a skirt portion; and (20) the container lid according to any one of (16) to (18), wherein the container lid is a dome-shaped lid.

Effect of the Invention

In accordance with the method for producing a food-filled and sealed container of the present invention, the container lid is not deformed after sealing and it is possible to obtain a sealed container having a high product value in which food is filled.

MODE OF CARRYING OUT THE INVENTION

Figure 1:
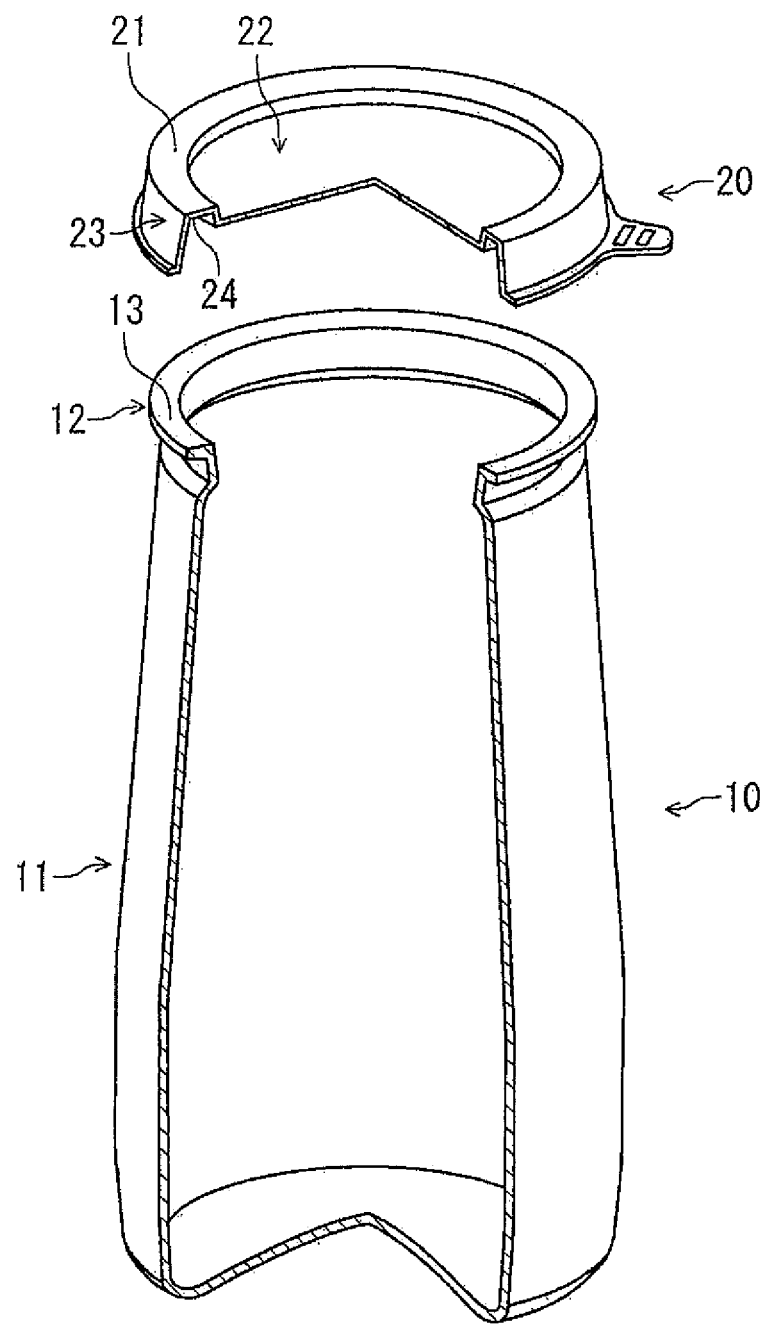
FIG. 1 is a schematic diagram showing an example of a container body and a container lid, which are used in the method for producing a food-filled and sealed container of the present invention.
Figure 2:
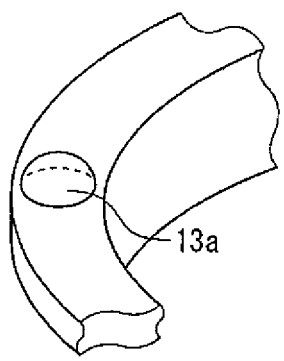
FIGS. 2(A) to 2(D) are diagrams showing variations of a concavity or convexity on the sealing surface of a container body of the present invention.
Figure 2:
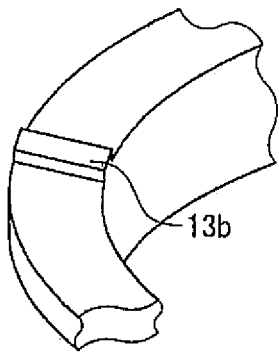
Figure 2:
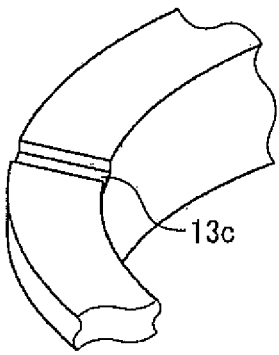
Figure 2:
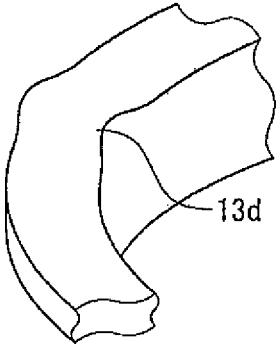

The first method for producing a food-filled and sealed container of the present invention is a method for producing a food-filled and sealed container which involves filling food in a container body made of thermoplastic resin, with an air-containing portion left in the container body, and thereafter sealing the container by heat sealing a container lid made of thermoplastic resin. There is no special limitation so long as this is a method for producing a food-filled and sealed container which involves using a container body or container lid having a concavity or convexity on a sealing surface, and a container body and a container lid, both having a concavity or convexity on a sealing surface, may be used.

The concavity or convexity on a sealing surface herein refer to concavity or convexity capable of forming, between the concavity or convexity, gaps which are in communication with the interior and exterior of the container when the container lid is placed on the container body. These concavities or convexities refer to, for example, projections or recesses (grooves) provided on a sealing surface having no concavity or convexity randomly or at prescribed intervals, and waviness formed on the sealing surface itself in a circumferential direction, and in terms of sealing properties, projections provided on a sealing surface having no concavity or convexity is preferable. These concavities or convexities may be those provided to such an extent that air passages are formed between the sealing surfaces when the container lid is placed on the container body. The height (depth) of projections or recess is preferably 0.05 to 1.5 mm, more preferably 0.1 to 0.8 mm, and most preferably 0.1 to 0.6 mm. The shape of projections or recesses is not especially limited, and projections or recesses whose cross-sectional shape is a semicircle, a triangle, and a quadrangle can be enumerated by way of example. Even when such concavities or convexities are provided on a sealing surface, the concavity or convexity disappear by the melting of thermoplastic resin, and hence concavity or convexity does not lower a product value. When recesses are provided in the container body or container lid, in order to ensure that the air in the container is discharged to the outside, the recesses are provided so that they extend through the radial direction of the sealing surface of the container body or container lid.

Specifically, for example, on the sealing surface of a container body, it is possible to provide, in a plurality of places (for example, 4 to 16 places), semispherical projections having a radius of 0.3 to 2.0 mm or so and a height of 0.05 to 1.5 mm, linear projections having a width of 0.1 to 1.0 mm or so and a height of 0.05 to 1.5 mm, which are provided radially, and liner grooves having a width of 0.1 to 1.0 mm or so and a height (depth) of 0.05 to 1.5 mm, which are radially extended therethrough. Also, on the circular sealing surface of a container lid, it is possible to provide, in a plurality of places, semispherical projections having a radius of 0.3 to 2.0 mm or so and a height of 0.05 to 1.5 mm, linear projections having a width of 0.1 to 1.0 mm or so and a height of 0.05 to 1.5 mm, which are provided radially, and linear grooves having a width of 0.1 to 1.0 mm or so and a height (depth) of 0.05 to 1.5 mm, which are radially extended therethrough.

The number of projections and grooves are not especially limited. However, this number is preferably 4 or more, more preferably 8 to 32, because the larger the number, the larger energy is required by sealing (solvent welding), and also the longer the sealing time, with the result that the gap formed between the container body and the sealing surface is maintained longer and hence a larger volume of the air in the container is removed.

As described above, in the method for producing a food-filled and sealed container of the present invention, it is possible to use a container body and/or a container lid having a concavity or convexity on a sealing surface. However, it is preferred that a container body having no concavity or convexity on a sealing surface, and a container lid having a concavity or convexity on a sealing surface is used. Even in the case where concavity or convexity is provided on the sealing surface of a container body, almost all the concavities or convexities disappear because of the melting of the thermoplastic resin. However, because in the case where concavities or convexities are provided on the container lid side, the sealing surface of the container body is kept in a condition in which the sealing surface is more free from concavity or convexity and hence, for example, when the mouth directly touches the container body when drinking and eating, this does not bring about discomfort and the beauty of the container body itself frequently noticed during drinking and eating is kept. Incidentally, having no concavity or convexity on a sealing surface refers to having no concavity or convexity which might be able to form, on a sealing surface, gaps in communication with the interior and exterior of the container (having no concavity or convexity in the circumferential direction). Having no concavity or convexity includes not only the case of a flat sealing surface, but also for example, the case of a sealing surface which bulges to show a section in the shape of a circular arc so long as the sealing surface does not have concavity or convexity as described above.

The above-described container body made of thermoplastic resin having a concavity or convexity on a sealing surface can be fabricated, for example, by forming a concavity or convexity on a sealing surface of a container body having no concavity or convexity on the sealing surface. Specifically, this container body can be fabricated by a method comprising forming projections by the welding of a thermoplastic resin on a sealing surface having no concavity or convexity, a method comprising forming projections on the front side of a sealing surface by applying a pressing force from the back side of a sealing surface having no concavity or convexity, a method comprising forming recesses by cutting away part of a sealing surface having no concavity or convexity, and a method comprising pressing a resin melting member whose surface has concavity or convexity against a sealing surface having no concavity or convexity. Also, a container body having a concavity or convexity on a sealing surface may be fabricated by forming a concavity or convexity at the same time with the molding of the container body. Incidentally, the container body can be molded by publicly-known molding methods, such as injection molding and blow molding.

The above-described container lid made of thermoplastic resin having a concavity or convexity on a sealing surface can be fabricated, for example, by forming a concavity or convexity on a sealing surface of a container lid having no concavity or convexity on the sealing surface. Specifically, as with the container body, this container lid can be fabricated by a method comprising forming projections by the welding of a thermoplastic resin on a sealing surface having no concavity or convexity, a method comprising forming projections on the front side of a sealing surface by applying a pressing force from the back side of a sealing surface having no concavity or convexity, a method which involves forming recesses by cutting away part of a sealing surface having no concavity or convexity, and a method comprising pressing a resin melting member whose surface has a concavity or convexity against a sealing surface having no concavity or convexity. Also, a container lid having a concavity or convexity on a sealing surface may be fabricated by forming a concavity or convexity at the same time with the molding of the container lid. Furthermore, in the case of molding using a sheet material, the container lid can be fabricated by using a sheet material having a concavity or convexity.

The container body made of thermoplastic resin and the container lid made of thermoplastic resin in the present invention refer to a container body and a container lid which are made mainly of thermoplastic resin and may have an antistatic layer, a gas barrier layer, a printed layer and the like consisting of components other than thermoplastic resin. Conventional publicly-known thermoplastic resins, such as polyethylene, polypropylene, polystyrene, AS resin and ABS resin, can be enumerated as embodiments of thermoplastic resins which become main components of such container body and container lid. Although the kinds of thermoplastic resin used in the fabrication of a container body and a container lid may be different from each other, the same kind of resin is desirable in terms of recyclability. Specifically, the container bodies made of the polystyrene-based resins and container lids provided with a top portion and a skirt portion and having shape retention property, which are fabricated by cold molding from a polystyrene-based resin sheet, described in Japanese unexamined Patent Application Publication No. 2004-74795, Japanese Unexamined Patent Application Publication No. 2004-74796, Japanese Unexamined Patent Application Publication No. 2004-75196, Japanese Unexamined Patent Application Publication No. 2004-75197, and Japanese Unexamined Patent Application Publication No. 2004-154957, can be enumerated by way of example in a preferable manner as the container body made of thermoplastic resin and the container lid made of thermoplastic resin in the present invention. When concavity or convexity is formed on a container lid fabricated by cold molding, for example, the concavity or convexity is formed beforehand on the former and/or lid-thrusting-back piston described in Japanese Unexamined Patent Application Publication No. 2004-154957, and at the same time with the cold molding of a container lid, a concavity or convexity can be formed on the container lid.

The heat sealing method in the method for producing a food-filled and sealed container of the present invention is not especially limited, so long as it is a method comprising heat-fusing and sealing (heat welding) the thermoplastic resin of a container body and/or container lid, and the hot-plate welding method, the hot-air sealing method, the high-frequency sealing method, and the ultrasonic sealing method can be enumerated by way of example. In terms of sealing properties and the like, the ultrasonic sealing method is preferable. In the method for producing a food-filled and sealed container of the present invention, because the container body or container lid has a concavity or convexity on a sealing surface and the construction is such that the air in the container can escape to the outside, the air is caused to escape to the outside at the same time with this heat sealing, and the volume of the air remaining in the container decreases, making it possible to prevent the container lid from being deformed after sealing.

During this heat sealing, heat sealing is performed by pressing the central part of the container lid on the inner side of the sealing surface of the lid, whereby it is possible to cause a larger volume of air to be discharged to outside the container and hence it is possible to prevent the deformation of the container lid after sealing more positively. Specifically, for example, it is preferred that heat sealing be performed using a heat sealing device having protrusions in the central part of the horn (corresponding to the central part of the container lid).

In the case where ultrasonic sealing is performed, it is preferred that sealing be performed using a horn provided with warming means. From this fact, the air in the container is heated by the heat of the horn and expands, with the result that the expanded air can also be discharged to outside the container, thereby making it possible to reduce the volume of the air remaining in the container. For example, a ring-shaped air blow tube arranged along the circumference of the horn can be mentioned as the horn warming means. The ring-shaped air blow tube along the circumference of the horn is generally provided to prevent the overheating of the horn. In the method of the present invention, however, it is possible to increase the operational advantage of the present invention by blowing hot wind or warm wind by use of this air blow tube.

Furthermore, in performing sealing, it is preferred that sealing be performed, with the container body compressed in vertical direction, and the amount of compression is, for example, in the order of 0.3 to 3.0 mm. That is, the container body is compressed during sealing by means of the horn of the heat sealing device and the container placement bed (bin bed) from above and from below, whereby it is possible to discharge a larger volume of air in the container.

The second method for producing a food-filled and sealed container of the present invention is a method for producing a food-filled and sealed container comprising filling food in a container body made of heat-resistant resin, metal or paper and thereafter sealing the container by heat sealing a container lid made of thermoplastic resin. There is no special limitation so long as this is a method for producing a food-filled and sealed container comprising using a container lid having a concavity or convexity on a sealing surface. For a container lid having a concavity or convexity on a sealing surface and a heat sealing method, the same as described in the above-described first production method applies. In the second method for producing a food-filled and sealed container of the present invention, the container body is made of heat-resistant resin, metal or paper, and is fabricated mainly from each material. Heat-resistant resin refers to resins which are not affected by the heat during heat sealing, and specifically, it refers to thermoplastic resin which does not soften or is not melted during heat sealing and thermosetting resin which does not undergo thermal decomposition during heat sealing. Specifically, the aluminum container body and dome-shaped container lid made of thermoplastic resin which are described in Japanese Unexamined Patent Application Publication No. 2005-40096 can be mentioned by way of example in a preferable manner as the container body and container lid which can be used in the second method for producing a food-filled and sealed container of the present invention. In order to improve sealing properties, the sealing surface of the container body may be provided with a thermoplastic resin layer which is melted during heat sealing.

In a food-filled and sealed container produced by the above-described first and second methods for producing a food-filled and sealed container, the central part of a container lid is recessed and a negative pressure is developed in the container. As a result of this, even when environmental changes such as a rise in atmospheric pressure and a temperature drop occur, the container lid will not become recessed greatly from the initial condition, and also even when environmental changes such as a drop in atmospheric pressure and a temperature rise occur, a change in the condition of the air in the head space is such that first a pressure rise occurs and thereafter this pressure becomes equal to the atmospheric pressure, which is followed by a remarkable increase in volume, and the container lid begins to bulge. Therefore, the bulge of the container lid will not occur until a certain environmental change occurs.

Figure 3:
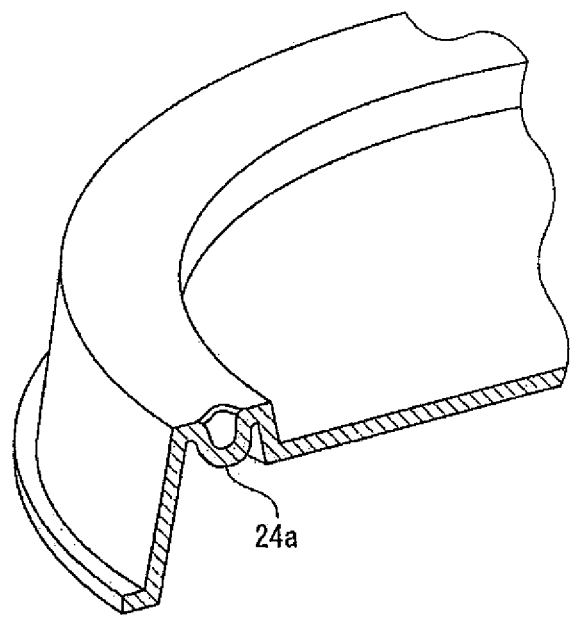
FIGS. 3(A) and (B) are diagrams showing variations of a concavity or convexity on the sealing surface of a container lid of the present invention.
Figure 3:
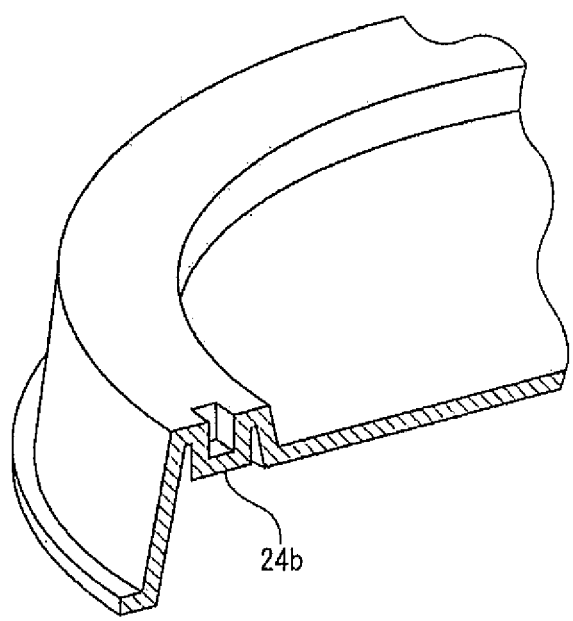
Figure 4:
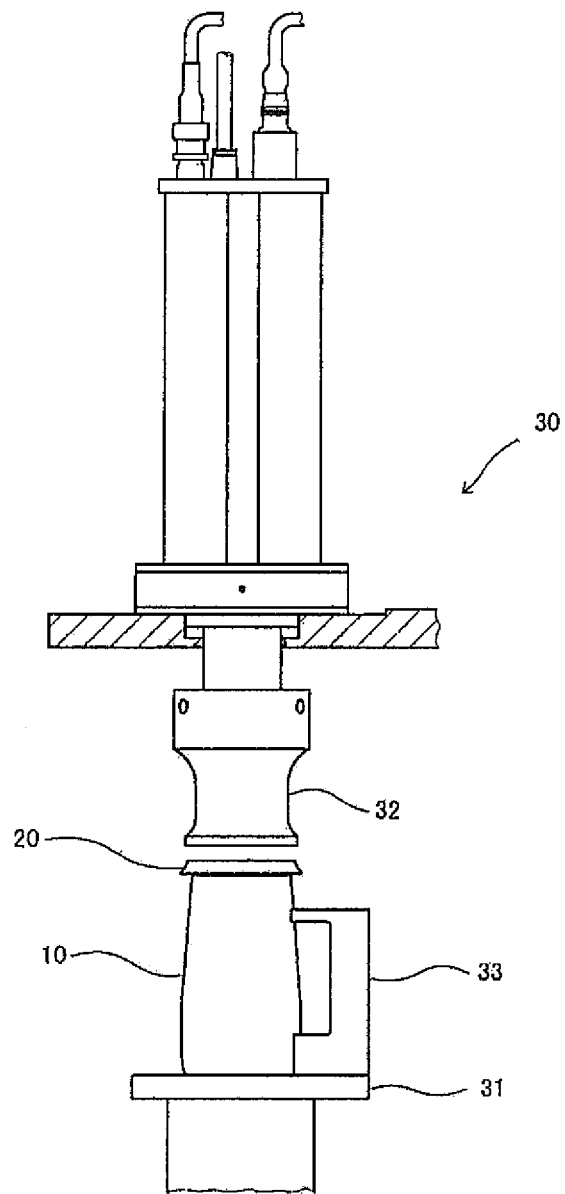
FIG. 4 is a diagram showing the principal part of an ultrasonic sealing device used in the method for producing a food-filled and sealed container of the present invention.
Figure 5:
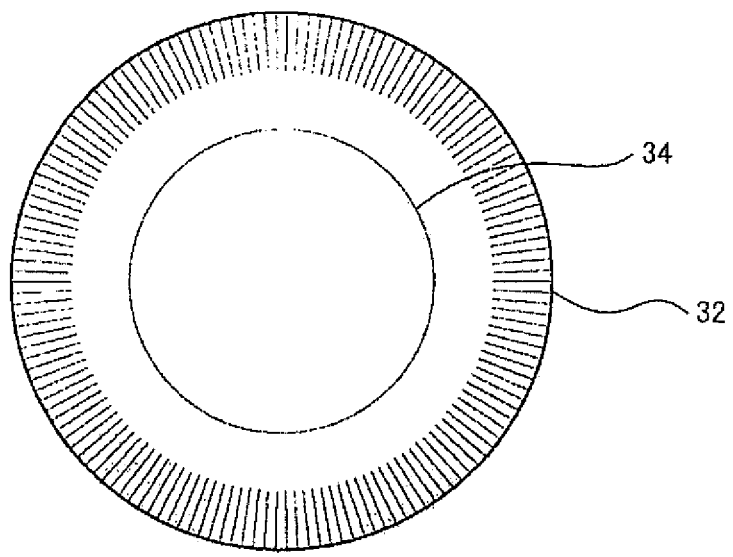
FIG. 5 is a bottom view of a horn of the ultrasonic sealing device shown in FIG. 4.
Figure 6:
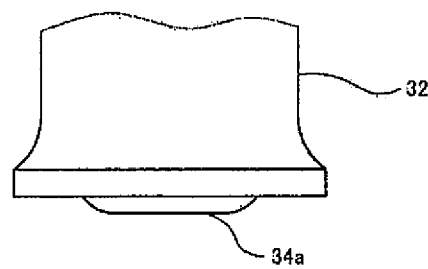
FIGS. 6(A) and 6(B) are side views showing variations of the horn of the ultrasonic sealing device shown in FIG. 4.
Figure 6:
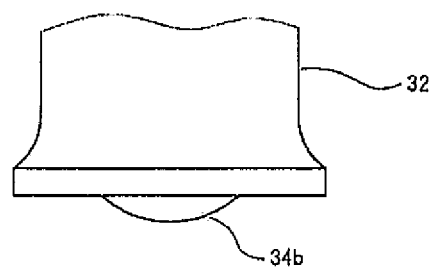

Hereinafter the present invention will be described more specifically with reference to the drawings. However, the technical range of the present invention is not limited by these exemplifications. FIG. 1 is a schematic diagram showing an example of a container body and a container lid, which are used in the method for producing a food-filled and sealed container of the present invention. FIGS. 2(A) to 2(D) are diagrams showing variations of the concavity or convexity on the sealing surface of a container body. FIGS. 3(A) and (B) are diagrams showing variations of the concavity or convexity on the sealing surface of a container lid. FIG. 4 is a diagram showing the principal part of an ultrasonic device used in the method for producing a food-filled and sealed container of the present invention. FIG. 5 is a bottom view of a horn of the ultrasonic device shown in FIG. 4. FIGS. 6(A) and 6(B) are side views showing variations of the horn of the ultrasonic device shown in FIG. 4. FIGS. 7(a) to 7(d) are rough explanatory diagrams of the method for producing a food-filled and sealed container of the present invention.

As shown in FIG. 1, a container body 10 used in the method for producing a food-filled and sealed container of the present invention is made of, for example, a polystyrene-based resin, and is provided with a barrel portion 11 and a flange 12, and an upper surface 13 of this flange 12 provides a sealing surface. A container lid 20 is made of a polystyrene-based resin as with the container body 10, and is provided with a top plate portion having a convex outer circumferential portion 21 corresponding to the flange 12 of the container body 10 and a skirt portion 23, and a lower surface 24 of the above-described convex outer circumferential portion 21 provides a sealing surface.

In the method for producing a food-filled and sealed container of the present invention, the container body 10 and/or the container lid 20, which have a concavity or convexity on the sealing surfaces 13, 24, are used. For example, as shown in FIGS. 2(A) to 2(D), the sealing surface 13 of the container body 10 is provided with semispherical projections 13a (FIG. 2(A)), projections 13b with a longitudinal cross section in rectangular parallelepiped shape, which are provided in an extending manner in a radial direction of the sealing surface (FIG. 2(B)), grooves 13c with a longitudinal cross section in quadrangular shape, which are provided in an extending manner in a radial direction of the sealing surface (FIG. 2(C)), and vertical waviness 13d (FIG. 2(D)). Furthermore, as shown in FIGS. 3(A) and 3(B), the sealing surface 24 of the container lid 20 is provided with semispherical projections 24a (FIG. 3(A)) and projections in rectangular parallelepiped shape (FIG. 3(B)).

In producing a sealed container by sealing the container body 10 and the container lid 20, which have a concavity or convexity in sealing surfaces as described above, it is possible to use, for example, an ultrasonic sealing device (for details, refer to WO2002-072426) as shown in FIG. 4. As shown in FIG. 4, an ultrasonic sealing device 30 is provided with a container placement bed 31 and a horn 32 arranged above the placement bed 31, and the container placement bed 31 is provided with container fixing means 33. As shown in FIG. 5 and FIGS. 6(A) and 6(B), the central part of the horn 32 of this ultrasonic sealing device 30 is provided with a protrusion 34, and for example, a protrusion 34a having a planar part in contact with the container lid 20 (FIG. 6(A)) and a protrusion 34b having a curved part in contact with the container lid 20 (FIG. 6(B)) can be mentioned as the shape of this protrusion 34.

Figure 7:
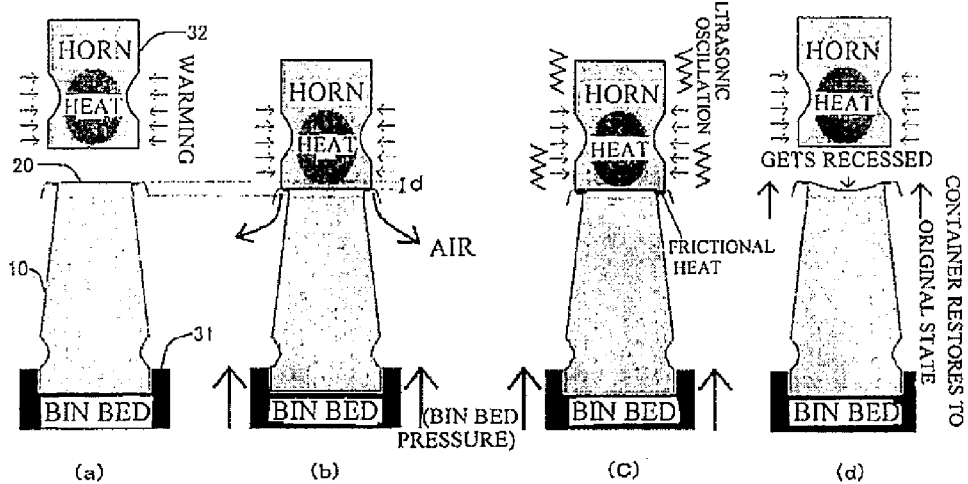
FIGS. 7(*a*) to 7(*d*) are rough explanatory diagrams of the method for producing a food-filled and sealed container of the present invention.

As shown in FIGS. 7(a) to 7(d), in sealing the container lid 20 to the container body 10 by use of the ultrasonic sealing device 30, first, the horn 32 of the ultrasonic sealing device 30 is warmed beforehand (FIG. 7(a)), and with the container body 10, on which the container lid 20 is put, placed on the placement bed (bin bed) 31, the placement bed 31 is moved upward and brought into contact with the horn 32 and then pressed, simultaneously with this, sealing is performed by causing ultrasonic rotary vibrations in the circumferential direction of the horn 32 to act (FIGS. 7(b) and 7(c)). At this time, the horn 32 having a protrusion in the central part is used and the container body 10 is compressed by a height d, resulting in a decrease in volume, and hence the air corresponding to this volume is discharged from gaps formed by the concavity or convexity of the sealing surfaces. Furthermore, because the air in the container is heated by the heat of the horn 32 and expands, also the expanded air is discharged. By lowering the container placement bed 31, the container is released from the bin bed pressure and restoration from the condition of compression deformation occurs and the volume returns to the initial state. However, because sealing is performed with the air volume smaller than in the initial stage, a negative pressure is developed in the container and hence a cap becomes recessed (FIG. 7(d)). As a result of this, it is possible to prevent the deformation of the container lid 20 after sealing. Incidentally, the bin bed pressure herein refers to a pressure applied to the container lid 20 and the container body 10 when the container body 10, on which the container lid 20 is put, comes into contact with the horn 32 and is pressed as a result of the upward movement of the placement bed (bin bed) 31.

EXAMPLES

Example 1

A food-filled and sealed container was produced from a container body consisting of a polystyrene-based resin and a container lid having shape retention which is fabricated by cold molding from a polystyrene-based resin sheet and is provided with a top plate portion and a skirt portion. A container body having no concavity or convexity on a sealing surface (an upper surface of a flange) of approximately 40 mm in diameter (a container body having a sealing surface with a cross section in the shape of a circular arc) and a container lid having projections extending to the container body side on a sealing surface, were used as the container body and container lid in an example of the present invention. On the container lid, 16 semispherical projections 1.4 mm in diameter and 0.8 mm in height were provided at equal intervals. In a comparative example, a container body and a container lid of the same configuration as in the example with the exception that the sealing surface of the container lid is not provided with a projection were used.

Sealed containers (samples) were fabricated from the container bodies and container lids of the example and comparative example. Specifically, after pouring water at 3° C. in the container bodies, the container lids were sealed by use of an ultrasonic sealing device (the CYS sealing test device ZB-26, made by Shikoku Kakoki Co., Ltd.), whereby sealed samples were fabricated. The inner pressure of the sealed samples was investigated. The inner pressure difference between the samples of the example and the comparative example was approximately 1.25 kPa, and a positive pressure was observed in the container of the comparative example, whereas a negative pressure was observed in the container of the example.

Test Example 1

Confirmation of Effect Obtained in Suppressing Container Lid Bulge

The samples were held for 6 hours or longer in a low-temperature room at a room temperature of 5° C. and brought into a steady state. Subsequently, the samples were moved into a temperature-controlled room at a room temperature of 37° C. and kept still, and the liquid temperature and the cap height were measured until the liquid temperature reached 30° C., at intervals of 15 minutes until a lapse of 60 minutes and at intervals of 30 minutes after a lapse of 60 minutes. A laser displacement gauge (LK-080 made by Keyence Corporation, resolution 0.1 μm) was used in the measurement of the cap height, and the measurements were made from above the samples which were caused to erect. Specifically, in each sample, measurements were made in the center of the cap and four places of the peripheral part 10 mm away from the center, and an average height of the five points with reference to the opening of the container was regarded as the height of the central part of the container lid of the sample in question. The results are shown in FIG. 8.

Figure 8:
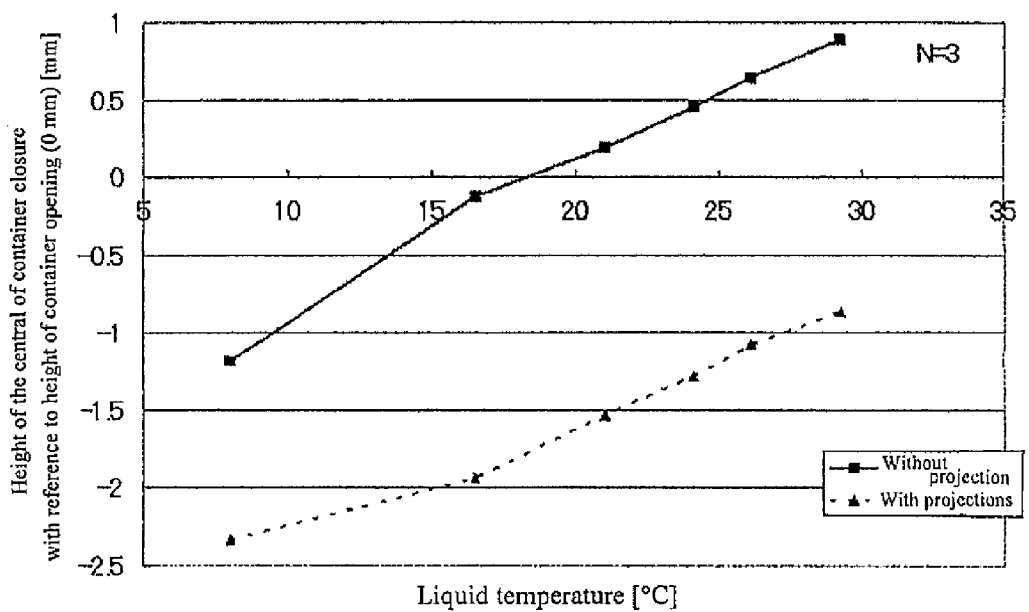
FIG. 8 is a graph showing the degree of bulge of a container lid due to a temperature rise of a sealed container in an example and in a comparative example.

From FIG. 8, it is apparent that in the container of the comparative example, the central part of the container lid bulged to a height of not less than the height of the container opening when the liquid temperature reached approximately 18° C., whereas in the container of the example, a recess of 0.9 mm was maintained even when the liquid temperature reached approximately 30° C., revealing that the example is effective in suppressing the phenomenon of container lid bulge. Also in the case where the height of projections is 0.1 mm and 0.6 mm, it was ascertained that the example is effective in suppressing the phenomenon of container lid bulge.

Test Example 2

Figure 9:
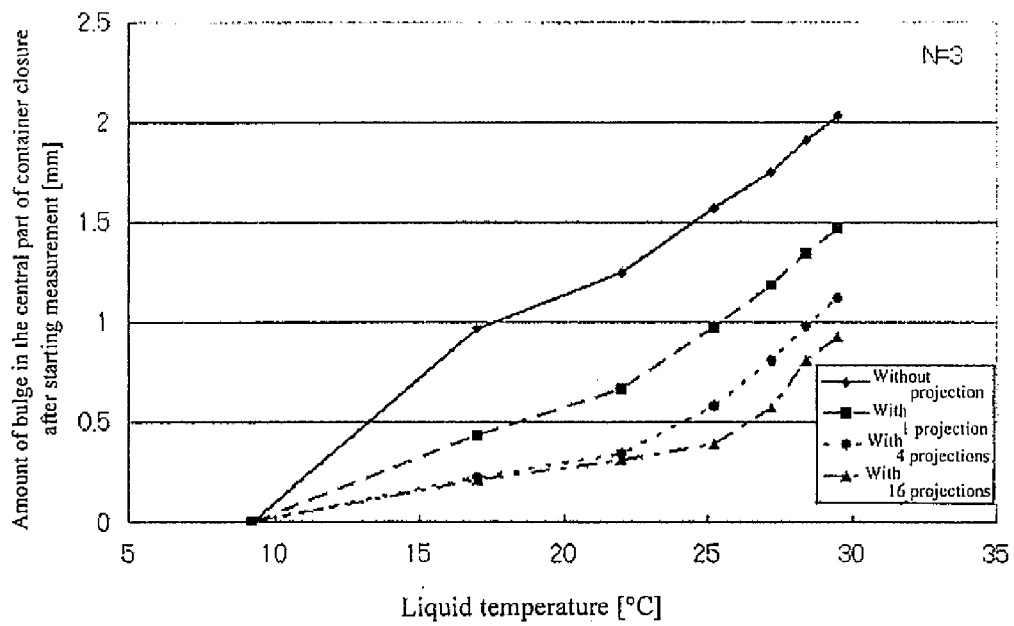
FIG. 9 is a graph showing the influence of the number of projections of a container lid on the effect in suppressing the bulging of the container lid.

Influence of Number of Projections on Effect Obtained in Suppressing Container Lid Bulge Also in the case where the number of projections of the container lid is 1 and 4, an investigation was made into the effect obtained in suppressing the container lid bulge in the same manner as in Test Example 1. FIG. 9 shows the amount of displacement of the central part height of the container lid after the start of the measurement, that is, the amount of the central part bulge of the container lid.

It is apparent from FIG. 9 that the larger the number of projections, the greater the effect obtained in suppressing the bulge. The reason for this can be estimated as follows. That is, because in sealing the container lid, solvent welding and sealing are performed by crushing projections, the larger the number of projections, the larger energy is required, the longer time is required from the start of oscillation to the completion of sealing, and the larger volume of air escapes, with the result that a great effect is obtained in suppressing the bulge phenomenon.

Test Example 3

Influence of Horn Warming on Effect Obtained in Suppressing Container Lid Bulge

Figure 10:
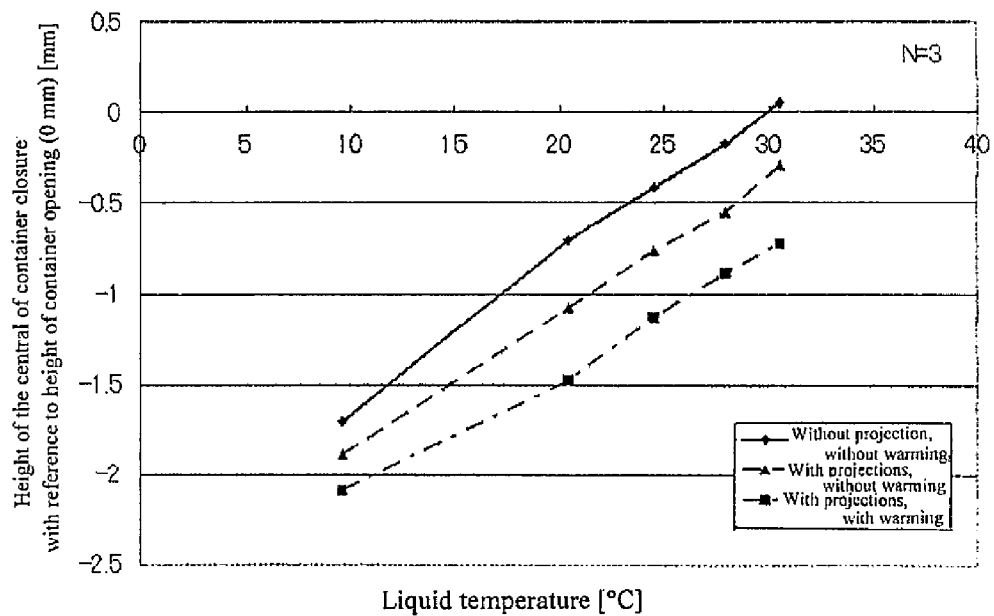
FIG. 10 is a graph showing the influence of warming the horn of the ultrasonic sealing device on the effect in suppressing the bulging of the container lid.

Also in the case where the horn of the ultrasonic sealing device is warmed to 40° C. and the case where the horn is not warmed, an investigation was made into the effect obtained in suppressing the container lid bulge in the same manner as in Test Example 1. FIG. 10 shows the results.

As shown in FIG. 10, the bulge of the container lid resulting from a rise in liquid temperature is obviously smaller in the case where the horn was warmed than in the case where the horn was not warmed, and it is apparent that the effect obtained in suppressing the container lid bulge is increased by warming the horn.

EXPLANATION OF LETTERS OR NUMERALS

10 Container body
11 Barrel portion
12 Flange
13 Upper surface (sealing surface)
13*a* Semispherical projection
13*b* Projection in rectangular parallelepiped shape
13*c* Groove
13*d* Waviness
20 Container lid
21 Convex outer circumferential portion
22 Top plate portion
23 Skirt portion
24 Lower surface (sealing surface)
24*a* Semispherical projection
24*b* Projection in rectangular parallelepiped shape
30 Ultrasonic sealing device
31 Placement bed
32 Horn
33 Container fixing means
34 Convex part

The invention claimed is:

1. A method for producing a food-filled and sealed container, comprising filling food in a container body made of polystyrene-based resin, and thereafter heat sealing a polystyrene-based resin container lid to the container body by pressing a central part of an inner side of the container lid, the container lid having a concavity or convexity on the sealing surface and gaps in the concavity or convexity which are in communication with the interior and exterior of the container when the container lid is on the container.

2. The method for producing a food-filled and sealed container according to claim 1, wherein heat sealing is performed by using an ultrasonic sealing device.

3. The method for producing a food-filled and sealed container according to claim 2, wherein a horn of the ultrasonic sealing device is provided with warming means.

4. The method for producing a food-filled and sealed container according to claim 1, wherein the container lid having a concavity or convexity on a sealing surface is fabricated by forming a concavity or convexity at the same time with the molding of the container body or container lid.

5. The method for producing a food-filled and sealed container according to claim 1, wherein the height of the concavity or convexity is 0.05 to 1.5 mm.

6. The method for producing a food-filled and sealed container according to claim 1, wherein sealing is performed with the container body compressed in a vertical direction.

* * * * *